W. H. BRISTOL.
SPEED INDICATING OR RECORDING DEVICE.
APPLICATION FILED APR. 23, 1909.
939,209.
Patented Nov. 9, 1909.
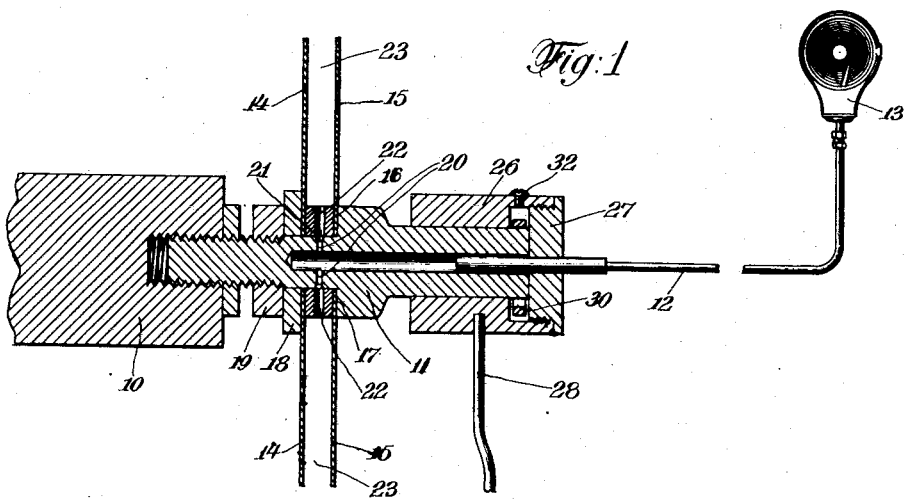
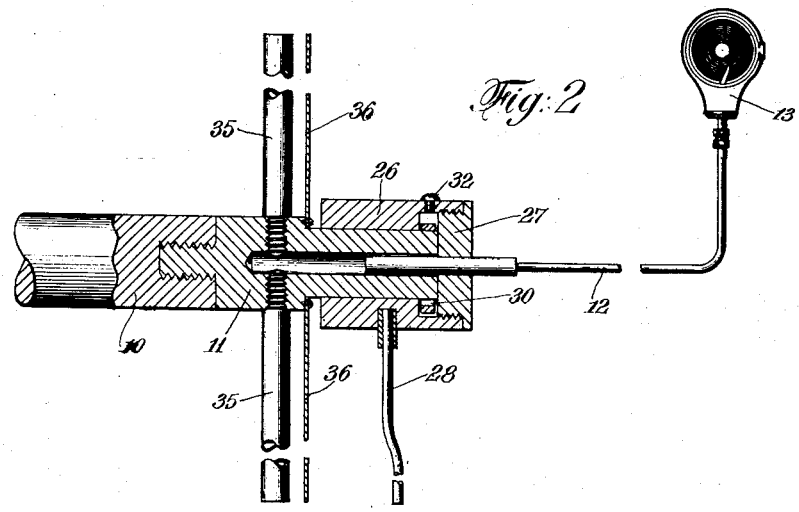

UNITED STATES PATENT OFFICE.

WILLIAM H. BRISTOL, OF WATERBURY, CONNECTICUT.

SPEED INDICATING OR RECORDING DEVICE.

939,209.  Specification of Letters Patent.  Patented Nov. 9, 1909.

Application filed April 23, 1909. Serial No. 491,834.

*To all whom it may concern:*

Be it known that I, WILLIAM H. BRISTOL, a citizen of the United States, and a resident of Waterbury, in the county of New Haven and State of Connecticut, have invented certain new and useful Improvements in Speed Indicating or Recording Devices, of which the following is a specification.

My invention relates to indicating or recording devices, and particularly to apparatus for indicating or recording the speed of rotating mechanisms.

It has for its object to indicate or record in a simple and effective manner, and at a distance from a rotating mechanism, the speed and variations of speed at which such mechanism rotates; also, to allow of the same indicating and recording device being employed for the indicating and recording of several ranges of speed. I attain these objects in the apparatus described in the specification and illustrated in the accompanying drawings, in which—

Figure 1 is a diagrammatic view illustrating the general arrangement and construction of the apparatus employed. Fig. 2 is a similar view of a modification.

Similar characters of reference designate corresponding parts throughout the several views.

Referring now to the drawings, 10 designates a rotating shaft suitably driven and whose speed and variations thereof, and thereby that of the driving mechanism (not shown), it is desired to indicate or record. To this shaft is coupled in any convenient manner a second shaft 11. In the apparatus illustrated, I have shown the second shaft 11 simply screwed into the driving shaft 10. The shaft 11 throughout a portion of its length is hollow and at the end opposite to the coupled end communicates with a suitable tube 12 leading to a pressure indicating or recording device 13, preferably of the flexible diaphragm type such as disclosed in my prior patents #822,244 and #839,981.

The shaft 11 is adapted to rotate a confined mass of air which is placed in communication with the said indicating and recording device 13 through the hollow portion of shaft 11 and a tube 12 of the desired length. As the said mass of air is rotated, the centrifugal force acting thereon will reduce the pressure in the said communications and therefore in said pressure indicating and recording device 13, the degree of reduction being a function of the velocity of rotation of said mass and the radius of its center of gravity. The radius being determined, the reduction of pressure will be a function of the velocity of rotation and will serve as a measure of said velocity which can be indicated and recorded by the said device 13.

In the embodiment illustrated in Fig. 1, the air is confined between two circular disks 14 and 15 mounted with a ring 16 on the shaft 11 and near the end of shaft 10, being secured against a shoulder 17 of the said shaft 11 by a washer 18 and a lock nut 19. A number of holes 20 are drilled into the shaft 11 to afford communication with the chamber formed by the hollow portion of said shaft, while at the other end of said holes a groove 21 is made in the said shaft. Coöperating with the groove 21 are a number of outlet holes 22 drilled through the ring 16 to afford communication with the air space 23 formed between the disks 14 and 15. A direct communication is thus provided between the said air space 23 and the indicating and recording device 13.

The outlet end of the shaft 11 is sealed by means of a stationary head 26 and a cap 27 screwed thereto and surrounding the said shaft. The said cap and head are secured against rotation by means of a spring support 28 which at the same time has tendency to hold the said head and cap toward the driving shaft end of the shaft 11.

A lubricating collar 30 is provided in connection with the said sealing means, and lubricant may be supplied to the same by removing the screw 32. By the aforesaid means the shaft end is effectively sealed and a direct communication afforded from the indicating and recording device 13 to the air space 23.

In the modification illustrated in Fig. 2, the air space 23 is reduced to a tube or tubes 35 which are simply screwed into the shaft 11 as shown and communicate directly with the hollow portion of said shaft. Both disks 14 and 15 may be dispensed with, although I prefer to provide a disk 36 simply as a means of protection against injury to or by the said tubes. The tubes are readily removable and replaceable by tubes of different lengths adapted to different speeds, whereby the same indicating or recording device 13 is applicable for different ranges of speed, corresponding charts, of course, being provided. In employing the disk form, sets of disks of various diameters may be provided for this purpose, and are readily substituted.

I claim:—

In a speed indicating or recording apparatus: vacuum producing means comprising a rotating shaft, hollow for a portion of its length, means to provide an air chamber communicating with the chamber formed by the hollow portion of said shaft and open at its periphery to the atmosphere, said air chamber to be rotated by said hollow shaft; a driving shaft connected to said hollow shaft; a stationary head, and a cap screwed thereto, surrounding the open end of said hollow shaft, and a spring supporting said head and cap to secure the same against rotation and to hold the same on said hollow shaft; pressure indicating or recording means; and means to connect the hollow portion of said hollow shaft with said pressure indicating or recording means to communicate to the latter the vacuum produced by the rotation of said air chamber.

Signed at New York in the county of New York and State of New York this 20th day of April A. D. 1909.

WILLIAM H. BRISTOL.

Witnesses:
FREDK. F. SCHUETZ,
SALLY O. YUDIZKY.